United States Patent
Asadullah et al.

(10) Patent No.: US 9,389,852 B2
(45) Date of Patent: Jul. 12, 2016

(54) TECHNIQUE FOR PLAGIARISM DETECTION IN PROGRAM SOURCE CODE FILES BASED ON DESIGN PATTERN

(71) Applicant: Infosys Limited, Bangalore (IN)

(72) Inventors: Allahbaksh Mohammedali Asadullah, Hubli (IN); Basava Raju Muddu, Bangalore (IN); Vasudev D. Bhat, Hubli (IN)

(73) Assignee: Infosys Limited, Bangalore (IN)

(*) Notice: Subject to any disclaimer, the term of this patent is extended or adjusted under 35 U.S.C. 154(b) by 1 day.

(21) Appl. No.: 14/614,255

(22) Filed: Feb. 4, 2015

(65) Prior Publication Data
US 2015/0227364 A1    Aug. 13, 2015

(30) Foreign Application Priority Data

Feb. 13, 2014  (IN) .............................. 678/CHE/2014

(51) Int. Cl.
G06F 17/27       (2006.01)
G06F 9/44        (2006.01)

(52) U.S. Cl.
CPC ...................................... *G06F 8/751* (2013.01)

(58) Field of Classification Search
CPC ............... G06F 7/78; G06F 8/00–8/78; G06F 9/44–9/455; G06F 11/36
See application file for complete search history.

(56) References Cited

U.S. PATENT DOCUMENTS

| | | | |
|---|---|---|---|
| 7,493,596 B2 | 2/2009 | Atkin et al. | |
| 7,823,127 B2 | 10/2010 | Zeidman | |
| 8,261,237 B2 | 9/2012 | Zeidman | |
| 2005/0114840 A1 | 5/2005 | Zeidman | |
| 2006/0005161 A1* | 1/2006 | Atkin et al. | 717/106 |
| 2007/0050358 A1* | 3/2007 | Ganesh et al. | 707/6 |
| 2009/0144702 A1* | 6/2009 | Atkin | G06F 8/71 717/121 |
| 2009/0313609 A1* | 12/2009 | Ackerman et al. | 717/127 |

OTHER PUBLICATIONS

Asadullah et al., Design Patterns based Pre-processing of Source Code for Plagiarism Detection, 2012.*

Poon et al., Instructor-Centric Source Code Plagiarism Detection and Plagiarism Corpus, 2012.*

Liu et al., "GPLAG: Detection of Software Plagiarism by Program Dependence Graph Analysis," http://citeseerx.ist.psu.edu/viewdoc/summary?doi<10.1.1.115.2808, KDD '06, Aug. 20-23, 2006, Philadelphia, PA, 10 pages.

* cited by examiner

*Primary Examiner* — Wei Zhen
*Assistant Examiner* — Zhan Chen
(74) *Attorney, Agent, or Firm* — Klarquist Sparkman, LLP

(57) ABSTRACT

A technique for source code plagiarism evaluation is disclosed. Program source code files of the object orientated program are received. Class data of the program source code files are determined to comprise of at least a block of one or more design patterns wherein the one or more design patterns are stored in a database. A plagiarism value is evaluated for each of the program source code files wherein the class data of the program source code file matches with class data of an original program source code file. Program source code files wherein the class data of each of the program source code files comprises of the block of the same design pattern are categorized and the plagiarism value of the categorized program source code files are analyzed.

18 Claims, 6 Drawing Sheets

| Creation Patterns 210 | Structural Patterns 230 | Behavioral Patterns 250 |
|---|---|---|
| Abstract Factory | Adapter | Chain of Responsibility |
| Builder | Bridge | Interpreter |
| Factory Method | Composite | Iterator |
| Prototype | Decorator | Mediator |
| Singleton | Facade | Memento |
| | Flyweight | Observer |
| | Proxy | State |
| | | Strategy |
| | | Template Method |
| | | Visitor |

DESIGN PATTERNS
200

FIG. 2

TECHNIQUE FOR PLAGIARISM DETECTION IN PROGRAM SOURCE CODE FILES BASED ON DESIGN PATTERN

FIELD

The field relates to source code plagiarism detection and more particularly to a technique for source code plagiarism detection based on design pattern usage in an object oriented program.

BACKGROUND

The advancement in technology, especially innovations related to information availability on Internet, has led to the increased unauthorized use of information. The easy availability of source code files of a software have led to the frequent source code plagiarism. Any plagiarized code may potentially lead to costly penalties and consequences to an enterprises. There exist large number of approaches to detect copied code in different software. Generally, some approaches leverage semantics of the language while others leverage the comments and/or metrics of the source code.

To combat source code plagiarism, many tools are available in the market for detecting plagiarism in source code. Typically, these tools are designed to work in a way that they depend on threshold percentages to report matching files or matching code segments. For a source code file to be reported as a plagiarized file or to say that the file contains plagiarized code, it must cross a certain threshold percentage match. This threshold is determined by the designers of the tool.

Though a predefined threshold or adjustable threshold has been set up for some tools, however, the existing technique does not consider the scenario where threshold percentage method may miss a potential candidate of plagiarism. For example, a piece of code may be copied from a freely accessible source and is split across various files by dividing the copied segment into smaller parts. In this scenario, if existing plagiarism checks are done on these set of files, the files which have a very small piece of code copied in them may miss out from being reported since they did not cross the threshold percentage. Hence, the file may not be reported as plagiarized.

Though existing techniques are adequate to find the copied code as they compare two programs to find code clones. Additionally, some techniques exist which detects plagiarism even when the user has made some modification in the format of the code after copying. However, the existing techniques are not capable to detect plagiarism if the user intelligently copy patterns based code and split it across source code files.

Therefore, there is a general need to implement a technique which utilizes plagiarism detection method in a program source code files based on design pattern.

SUMMARY

Several aspects of the present disclosure disclose a method and a system for plagiarism detection in a program source code files based on design pattern. Accordingly, the present disclosure is directed to a method, system and a computer readable medium for source code plagiarism evaluation in an object orientated program based on design patterns. In accordance of the present disclosure, as embodied and broadly described, a technique for source code plagiarism evaluation comprising: receiving one or more program source code files of the object orientated program; determining if a class data of the one or more program source code files comprises of at least a block of one or more design patterns wherein the one or more design patterns are stored in a database; evaluating a plagiarism value for each of the one or more program source code files wherein the class data of the program source code file matches with class data of an original program source code file; categorizing the program source code files wherein the class data of each of the program source code files comprises of the block of the same design pattern; and analyzing, by a plagiarism evaluation computing device, the plagiarism value of each of the categorized program source code file.

In one embodiment, the method further comprising: receiving, by a plagiarism evaluation computing device, the design patterns; and determining, by a plagiarism evaluation computing device, minimum number of class data required corresponding to each design pattern.

In another embodiment, the class data of the identified program source code files for the same design pattern is more than the minimum number of class data required of the design pattern.

In yet another embodiment, the method further comprising: adding the plagiarism value of the categorized program source code files; and comparing the added plagiarism value with a threshold value. Further, the method further comprising: extracting, by a plagiarism evaluation computing device, the program source code files from binary files of the object oriented program.

BRIEF DESCRIPTION OF THE DRAWINGS

FIG. 2 illustrates a sample design pattern list.

DETAILED DESCRIPTION

The following description is the full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings. While the invention described herein is provided with a certain degree of specificity, the present technique may be implemented with either greater or lesser specificity, depending on the needs of the user. Further, some of the features of the present technique may be used to get an advantage without the corresponding use of other features described in the following paragraphs. As such, the present description should be considered as merely illustrative of the principles of the present technique and not in limitation thereof.

Figure 1:
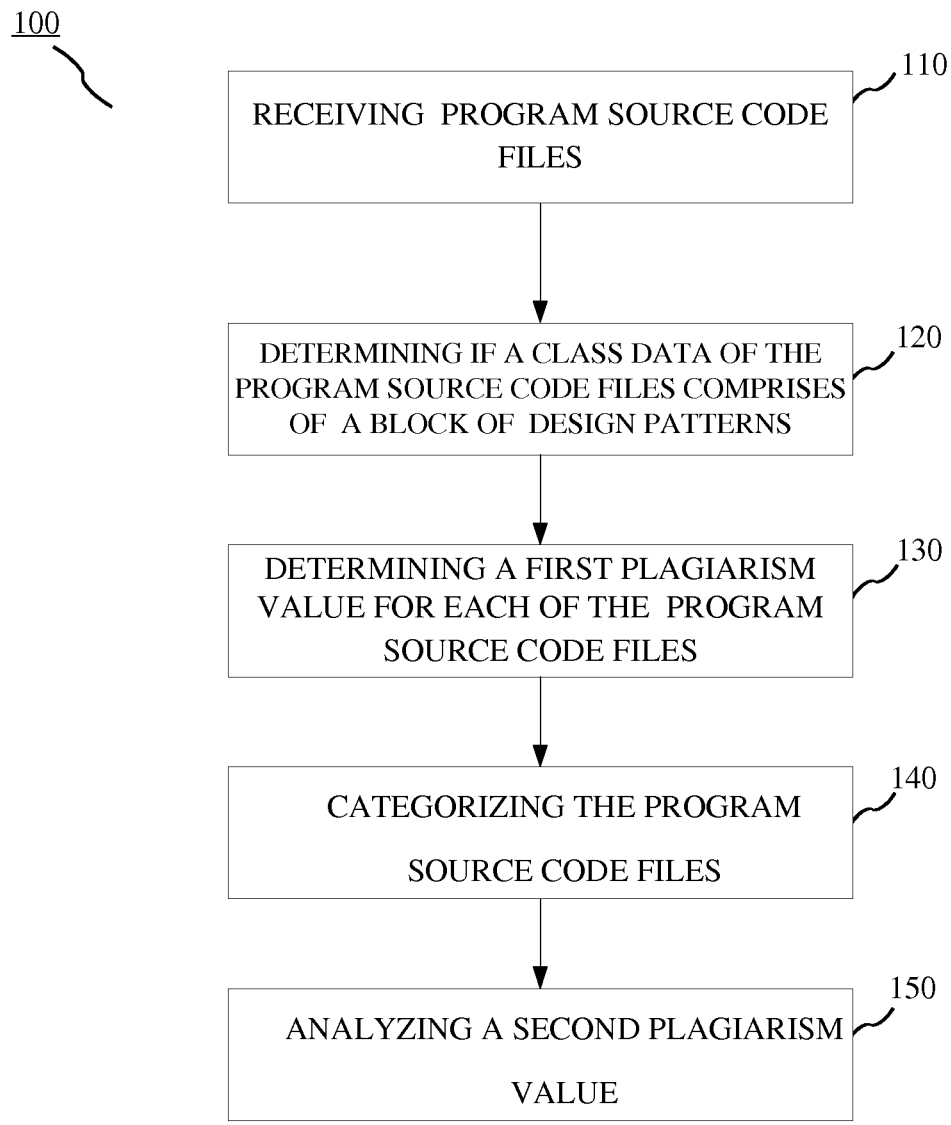
FIG. 1 illustrates a process flow for plagiarism detection in a program source code files.

FIG. 1 illustrates a process flow for plagiarism detection in a program source code files. The process 100, may be performed by processing logic that may comprise hardware (e.g. circuitry, programmable logic, microcode, etc.), software (such as instruction run on a processing device) or a combination thereof. In one embodiment, the process 100 is performed by a plagiarism evaluation computing device (e.g. 350 of FIG. 3).

At step 110, program source code files are received. The program source code files herein refers to the source code files developed for an object oriented program and comprises of class data. The program source code files may comprises of one or more design patterns. At step 120, class data of the program source code files are analyzed to determine if the corresponding source code of the class data includes any block of design pattern. The block as used herein may refer to a part of source code of a design pattern. At step 130, a plagiarism value has been evaluated for each source code file. In one embodiment, while evaluating plagiarism value for a program source code file, class data of the program source code file is matched with class data of the original program source code file. At step 140, the program source code files where the class data of each of the program source code file comprises of a block of the same design pattern, may be classified under one group. At step 150, the plagiarism value of the grouped program source code file are analyzed to detect the plagiarism in the source code.

FIG. 2 illustrates a sample design pattern list. A design pattern typically refers to pre-defined way of designing optimal solution for a common problem. The design patterns specifies modular code, which helps in maintainability and extensibility of the code. Generally, the design patterns are common and well used. Design pattern list (200) specifies sample of 23 patterns categorized under 3 categories comprising Creational Pattern 210, Structural Pattern 230 and Behavioral Pattern 250. Each design pattern may require minimum number of source code files/classes that need to be created to implement such design pattern.

Let us consider the example of visitor pattern which has been categorized under Behavioral Pattern 250. To implement a visitor pattern the minimum number of classes required is 4 and it can vary between 4 to n where n is any integer greater than 4. The four minimum classes to implement visitor are:

1. An abstract visitor class that provides an outline of what are the methods and classes to be visited.

2. A concrete visitor class that extends the abstract visitor to actually provide the functionality as to what this specific visitor is supposed to do. There can be any number of concrete visitors.

3. An abstract visitee class. A visitee is the class that accepts a visitor class and gets visited.

4. A concrete visitee class. There can be any number of concrete visitees that may accept only one visitor or any number of visitors.

The above identified classes are required to implement the visitor pattern. When a pattern implementation is found in the source code file under examination, the process 100 ensures if there is plagiarism in any of the program source code files that together implement a particular pattern.

In another example of Builder Pattern which has been categorized under Creation Pattern 210. This pattern proposes a solution for constructing a 'composite' item, through different possibilities for its components such as a meal consists of different item-types, each item-type has different options. The builder pattern comprises of the following classes 1. Composite Class, like a Meal class, providing get/set methods for each of its components 2. A builder interface, which provides build methods for each item/component in the composite class, and also a method to get the composite (finally built) object.

3. Concrete builder classes, implementing the builder interface, which take care of building specialized items as needed, for e.g. North-Indian-Meals-Builder, Andhra-Meals-Builder etc., which take care of building their choice of items for roti, bath, gravy etc.

For the Builder Pattern, minimum of 3 classes are required to implement this pattern. The user of this pattern may instantiate any one of the concrete builder classes and builds the composite object as needed.

Figure 3A:
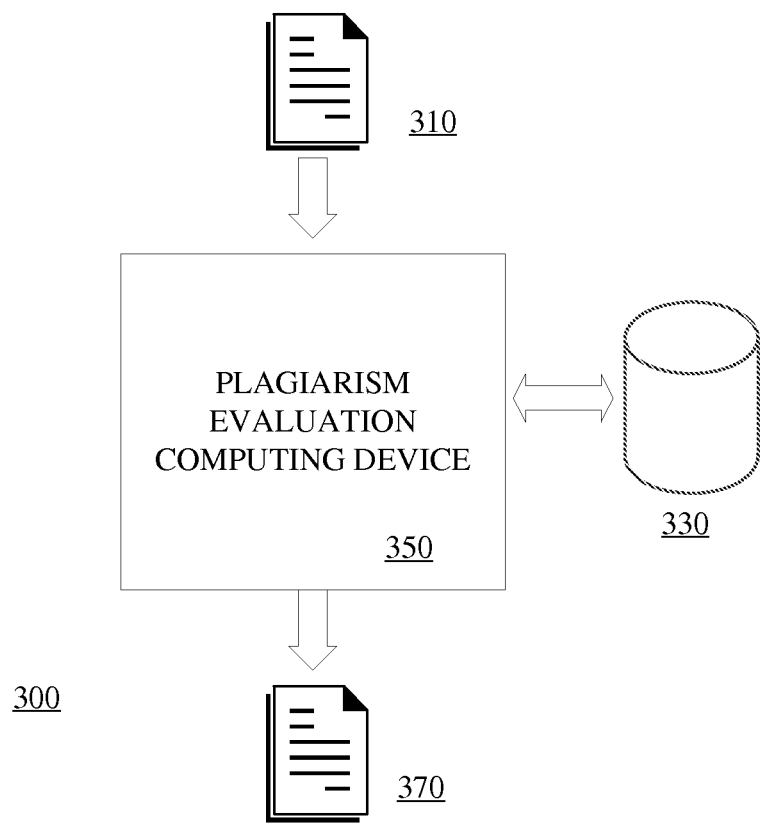
FIG. 3A illustrates a system blocks depicting the manner for plagiarism detection in a program source code.
Figure 3B:
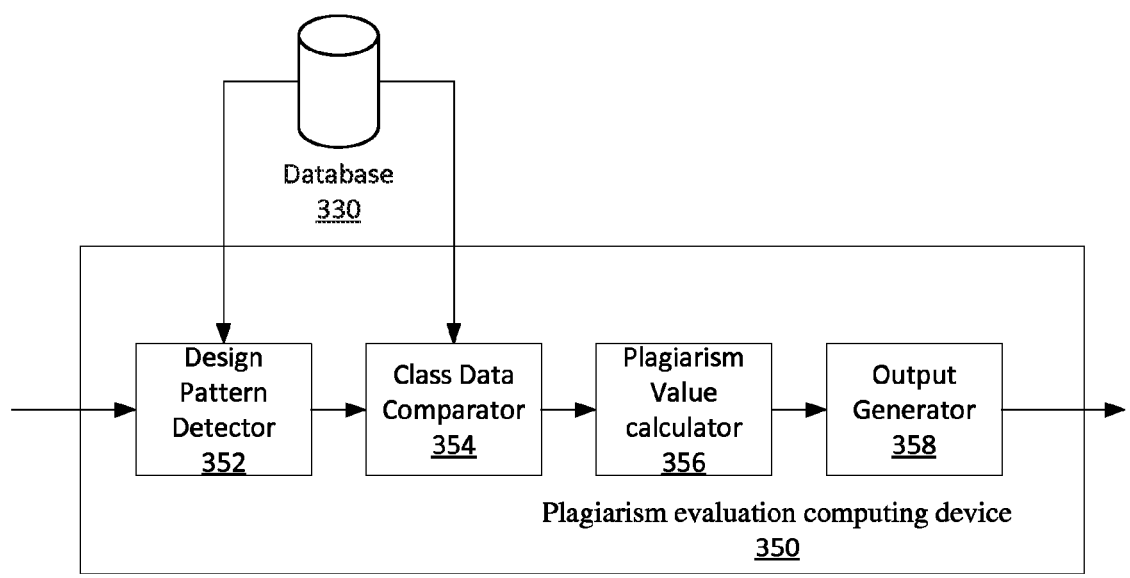
FIG. 3B illustrates a system blocks of a plagiarism evaluation computing device in accordance with one embodiment of the disclosure.

FIG. 3A illustrates a system blocks depicting the manner for plagiarism detection in a program source code. System 300 comprises of plagiarism evaluation computing device 350 and a database 330. A program source code files 310 of an object oriented program are given as input to plagiarism evaluation computing device 350. Plagiarism evaluation computing device 350 further comprises of design pattern detector 352, class data comparator 354, plagiarism value calculator 356 and output generator 358 of FIG. 3B. Program source code files 310 are received by plagiarism evaluation computing device 350 wherein design pattern detector 352 analyze received source code files 310. Design pattern detector 352 determines if a class data of program source code files 310 comprises of a block of design patterns. The design patterns is retrieved by design pattern detector 352 from database 330. Source code of program source code files 310 is matched with the design patterns by design pattern detector 352.

Class data comparator 354 categorizes program source code files which contains portion of same design pattern. Plagiarism value calculator 356 generates the plagiarism value of every program source code file by comparing class data of the program source code file 310 with class data of an original program source code file. The original program source code files may be retrieved from database 330. The plagiarism value for the categorized files are summed together for analyzing the plagiarism in program source code files 310. The plagiarism value as calculated is provided to a user by output generator 358. A report 370 may be generated indicating the total plagiarism value in program source code file 310.

In one embodiment, design pattern detector 352 retrieves a minimum number of class data required for every design pattern from database 330. While matching the source code of program source code files 310 with design pattern, design pattern detector 352 analysis if minimum number of class data is present in one or more program source code files. If program source code files 310 contains equal or more number of class data than the minimum class data required for implementation of a design pattern, then program source code files containing such class data may be analyzed in combination by plagiarism value calculator 356 for the purpose of plagiarism detection.

Figure 4:
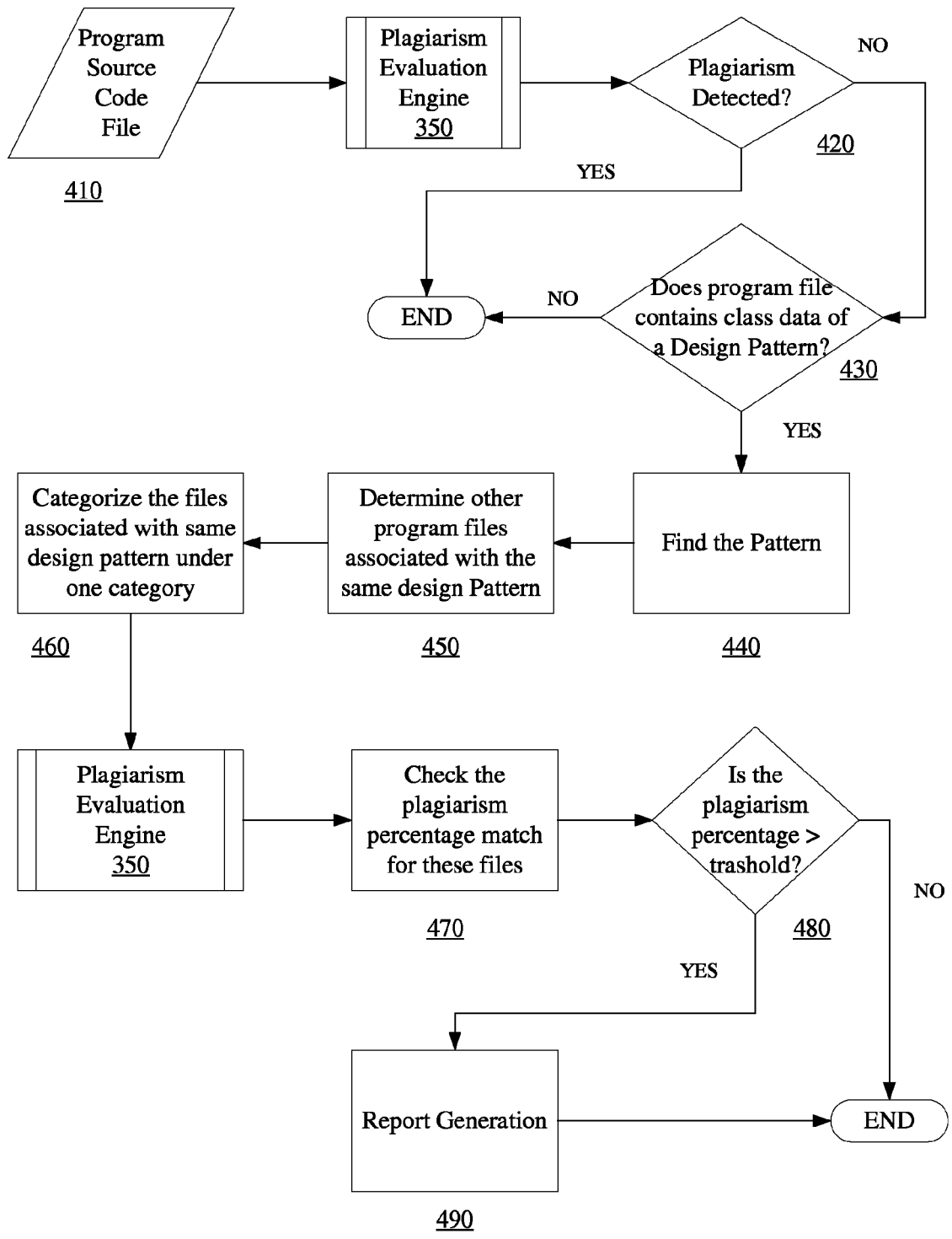
FIG. 4 illustrates an embodiment in accordance of the disclosure.

FIG. 4 illustrates an embodiment in accordance of the disclosure. At step 410, a set of program source code files are given as an input to plagiarism evaluation engine 350. Plagiarism evaluation engine 350 determines program source code files which are plagiarized files at step 420. At step 430, for every file that is reported by plagiarism evaluation engine, it is determined if program source code file is a part of a design pattern that is implemented in the source files. At step 440, pattern design is determined from the pattern designed stored in database 330. At step 450, the program source code file which are part of a same design pattern are determined. At step 460, categorize the files that are associated with this design pattern under one category.

At step 470, the plagiarism percent match for these files are calculated. At step 480, the percent match is checked with a threshold percentage. If the percentage match is higher than the threshold, same is reported to a user. This helps in identifying those files that were initially not reported by the plagiarism evaluation engine because they did not cross the threshold. The logic behind reporting them at a later point in time by analyzing their relationships in terms of patterns is that, when one of the files/classes implementing a particular pattern is reported, there is a high probability that the other files/classes associated with this pattern may also be plagiarized.

Exemplary Computing Environment

Figure 5:
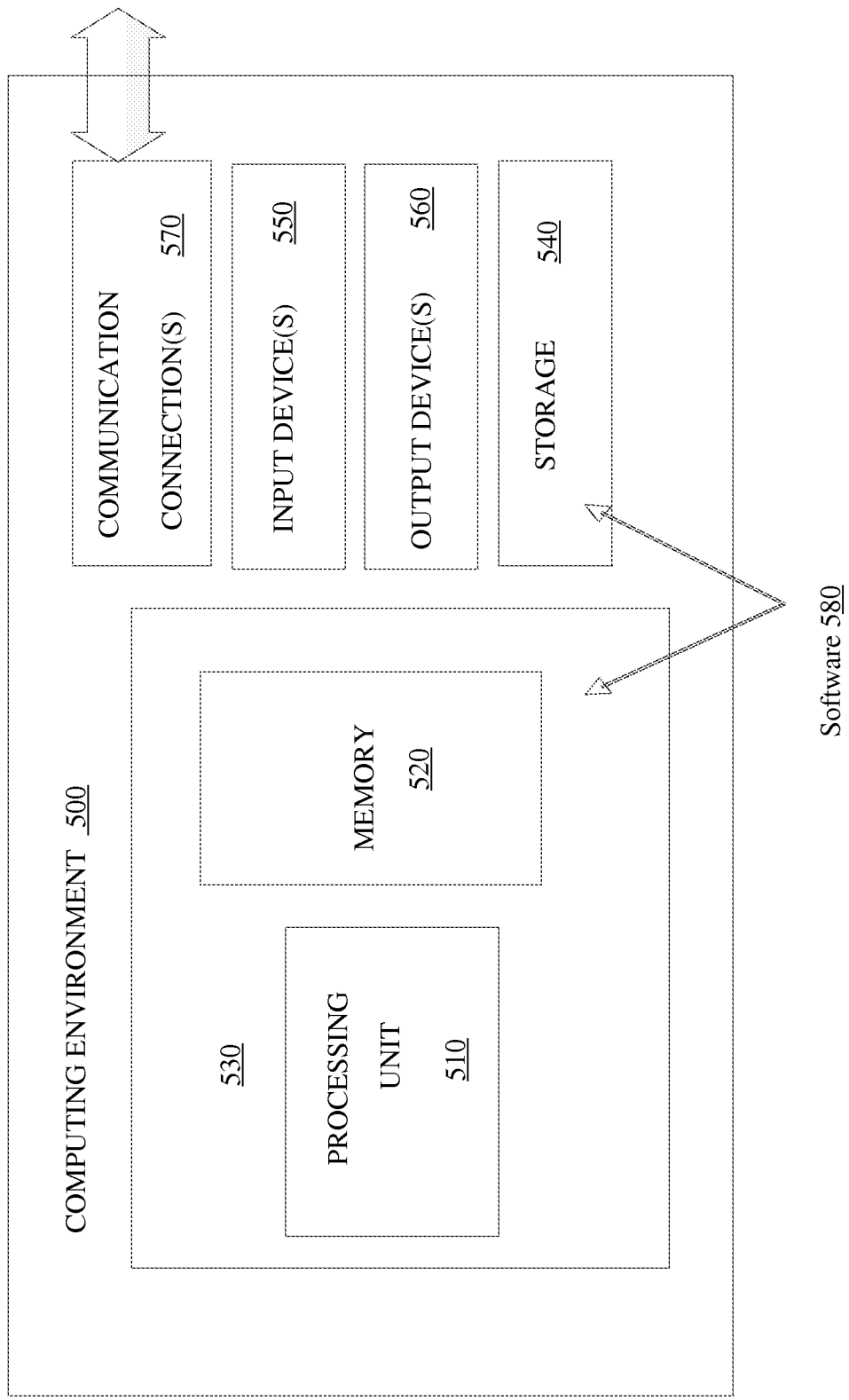
FIG. 5 shows an exemplary computing device useful for performing processes disclosed herein.

One or more of the above-described techniques may be implemented in or involve one or more computer systems. FIG. 5 illustrates a generalized example of a computing environment 500. The computing environment 500 is not intended to suggest any limitation as to scope of use or functionality of described embodiments.

With reference to FIG. 5, the computing environment 500 includes at least one processing unit 510 and memory 520. In FIG. 5, this most basic configuration 530 is included within a dashed line. The processing unit 510 executes computer-executable instructions and may be a real or a virtual processor. In a multi-processing system, multiple processing units execute computer-executable instructions to increase processing power. The memory 520 may be volatile memory (e.g., registers, cache, RAM), non-volatile memory (e.g., ROM, EEPROM, flash memory, etc.), or some combination of the two. In some embodiments, the memory 520 stores software 580 implementing described techniques.

A computing environment may have additional features. For example, the computing environment 500 includes storage 540, one or more input devices 550, one or more output devices 560, and one or more communication connections 570. An interconnection mechanism (not shown) such as a bus, controller, or network interconnects the components of the computing environment 500. Typically, operating system software (not shown) provides an operating environment for other software executing in the computing environment 500, and coordinates activities of the components of the computing environment 500.

The storage 540 may be removable or non-removable, and includes magnetic disks, magnetic tapes or cassettes, CD-ROMs, CD-RWs, DVDs, or any other medium which may be used to store information and which may be accessed within the computing environment 700. In some embodiments, the storage 540 stores instructions for the software 580.

The input device(s) 550 may be a touch input device such as a keyboard, mouse, pen, trackball, touch screen, or game controller, a voice input device, a scanning device, a digital camera, or another device that provides input to the computing environment 500. The output device(s) 560 may be a display, printer, speaker, or another device that provides output from the computing environment 500.

The communication connection(s) 570 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 500, computer-readable media include memory 520, storage 540, communication media, and combinations of any of the above.

Having described and illustrated the principles of our invention with reference to described embodiments, it will be recognized that the described embodiments may be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

What is claimed is:

1. A method for source code plagiarism evaluation in an object orientated program based on design patterns, the method comprising:
  receiving, by a plagiarism evaluation computing device, a plurality of program source code files of the object orientated program;
  determining, by a plagiarism evaluation computing device, if one or more classes at least partially specified by the plurality of program source code files specify at least a portion of one or more design patterns comprising pre-defined modular code;
  determining, by a plagiarism evaluation computing device, a plagiarism value for each of the plurality of program source code files by comparing one or more classes at least partially specified by a program source code file of the plurality of program source code files with one or more classes at least partially specified by an original program source code file;
  categorizing, by a plagiarism evaluation computing device, each of the plurality of program source code files that specifies at least part of a design pattern by at least one design pattern at least partially specified by the program source code file; and
  determining, by a plagiarism evaluation computing device, a total plagiarism value for a category based on the plagiarism values for each of the program source code files in the category.

2. The method of claim 1, the method further comprising:
  receiving, by a plagiarism evaluation computing device, the design patterns; and
  determining, by a plagiarism evaluation computing device, a minimum number of classes required to implement each design pattern.

3. The method of claim 2, further comprising:
  determining a number of classes specified by the plurality of program source code files; and
  comparing the number of classes specified by the plurality of program source code files with the minimum number of classes required to implement a design pattern.

4. The method of claim 1, the method further comprising: comparing the total plagiarism value with a threshold value.

5. The method of claim 1, the method further comprising:
extracting, by a plagiarism evaluation computing device, the program source code files from binary files of the object oriented program.

6. The method of claim 1, wherein the one or more design patterns are stored in a database.

7. A plagiarism evaluation computing device for source code plagiarism evaluation in an object orientated program based on a design pattern, the device comprising:
a processor; and
memory operatively coupled to the processor, the memory storing computer executable instructions which, when executed by the processor, cause the processor to carry out a method comprising:
receiving, by a plagiarism evaluation computing device, a plurality of program source code files of the object orientated program;
determining, by a plagiarism evaluation computing device, if one or more classes at least partially specified by the plurality of program source code files specify at least a portion of one or more design patterns, wherein a design pattern specifies predefined elements of modular code;
determining, by a plagiarism evaluation computing device, a plagiarism value for each of the plurality of program source code files by comparing one or more classes at least partially specified by a program source code file of the plurality of program source code files with one or more classes at least partially specified by an original program source code file;
categorizing, by a plagiarism evaluation computing device, each of the plurality of program source code files that specifies at least part of a design pattern by at least one design pattern at least partially specified by the program source code file; and
determining, by a plagiarism evaluation computing device, a total plagiarism value for a category based on the plagiarism values for each of the program source code files in the category.

8. The plagiarism evaluation computing device of claim 7, wherein the method further comprises:
receiving, by a plagiarism evaluation computing device, the design patterns; and
determining, by a plagiarism evaluation computing device, a minimum number of classes required to implement each design pattern.

9. The plagiarism evaluation computing device of claim 8, wherein the method further comprises:
determining a number of classes specified by the plurality of program source code files; and
comparing the number of classes specified by the plurality of program source code files with the minimum number of classes required to implement a design pattern.

10. The plagiarism evaluation computing device of claim 7, wherein the method further comprises:
comparing the total plagiarism value with a threshold value.

11. The plagiarism evaluation computing device of claim 7, wherein the method further comprises:
extracting, by a plagiarism evaluation computing device, the program source code files from binary files of the object oriented program.

12. The plagiarism evaluation computing device of claim 7, wherein the one or more design patterns are stored in a database.

13. A non-transitory computer-readable medium having stored thereon computer-readable code that, when executed by a computing device, performs a method for source code plagiarism evaluation in an object orientated program based on design patterns, the method comprising:
storing one or more software design patterns, the one or more software design patterns representing pre-defined ways of designing a solution to a programming problem and being specified by one or more classes;
receiving a plurality of program source code files of the object orientated program;
determining whether the plurality of program source code files specify one or more of the stored software design patterns;
determining if one or more classes at least partially specified by the plurality of program source code files specify at least a portion of one or more of the stored software design patterns;
determining a plagiarism value for each of the plurality of program source code files by comparing one or more classes at least partially specified by a program source code file of the plurality of program source code files with one or more classes at least partially specified by an original program source code file;
assigning a software design pattern category to two or more of the plurality of program source code files that specify at least a portion of the same software design pattern; and
determining a total plagiarism value for a category based on the plagiarism values for each of the program source code files in the category.

14. The non-transitory computer-readable medium of claim 13, the method further comprising:
receiving, by a plagiarism evaluation computing device, the software design patterns; and
determining, by a plagiarism evaluation computing device, a minimum number of classes required to implement each software design pattern.

15. The non-transitory computer-readable medium of claim 14, further comprising:
determining a number of classes specified by the plurality of program source code files; and
comparing the number of classes specified by the plurality of program source code files with the minimum number of classes required to implement a stored software design pattern.

16. The non-transitory computer-readable medium of claim 13, the method further comprising:
comparing the total plagiarism value with a threshold value.

17. The non-transitory computer-readable medium of claim 13, the method further comprising:
extracting, by a plagiarism evaluation computing device, the program source code files from binary files of the object oriented program.

18. The non-transitory computer-readable medium of claim 13, wherein the one or more software design patterns are stored in a database.

* * * * *